United States Patent [19]

Asada

[11] 4,283,769
[45] Aug. 11, 1981

[54] TIME INFORMATION PRINT OUT AT A PRESELECTED CONDITION IN AN ELECTRONIC CALCULATOR

[75] Inventor: Atsushi Asada, Nara, Japan

[73] Assignee: Sharp Kabushiki Kaisha, Osaka, Japan

[21] Appl. No.: 18,328

[22] Filed: Mar. 7, 1979

[30] Foreign Application Priority Data

Mar. 15, 1978 [JP] Japan .................................. 53-30343

[51] Int. Cl.³ .......................... G06F 3/12; G06F 15/02
[52] U.S. Cl. ...................................... 364/710; 346/20; 364/569; 364/705
[58] Field of Search ............... 364/705, 710, 569, 200, 364/900; 235/92 TF; 346/20, 80

[56] References Cited

U.S. PATENT DOCUMENTS

| | | | |
|---|---|---|---|
| 3,178,689 | 4/1965 | McKenna | 364/200 |
| 3,955,355 | 5/1976 | Luce | 364/705 X |
| 4,044,228 | 8/1977 | Kishimoto et al. | 364/709 X |
| 4,088,990 | 5/1978 | Sass | 346/20 X |
| 4,115,870 | 9/1978 | Lowell | 364/900 |
| 4,117,542 | 9/1978 | Klausner et al. | 364/705 X |
| 4,152,771 | 5/1979 | Olander, Jr. et al. | 364/710 |
| 4,164,038 | 8/1979 | Nachtigal | 364/705 |

Primary Examiner—Jerry Smith
Attorney, Agent, or Firm—Birch, Stewart, Kolasch & Birch

[57] ABSTRACT

A printer calculator includes a time information keeping circuit for storing current time information. A state detection means is provided in the printer calculator for printing out the current time information stored in the time information keeping circuit when a preselected state occurs in the printer calculator. The state detection means can be responsive to, for example, actuation of a particular key included in a keyboard panel of the printer calculator, and/or initiation of power supply to the printer calculator.

5 Claims, 8 Drawing Figures

TIME INFORMATION PRINT OUT AT A PRESELECTED CONDITION IN AN ELECTRONIC CALCULATOR

BACKGROUND AND SUMMARY OF THE INVENTION

The present invention relates to a printer calculator and, more particularly, to a printer control system in an electronic calculator for printing out time information stored in an electronic calculator at a preselected condition.

In the conventional printer calculator, date information or current time information can be printed out on a print receiving paper by introducing desired date information or current time information into the printer calculator through a keyboard panel. With the aforementioned procedure, there is a possibility that the date information or the current time information is erroneously printed out.

Accordingly, an object of the present invention is to provide a novel printer calculator.

Another object of the present invention is to provide a printer control system in an electronic printer calculator for printing out time information stored in an electronic printer calculator when a preselected condition occurs.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic calculator comprises a printer, a printer control system, and a current time information keeping circuit. The current time information keeping circuit is continuously power supplied to memorize and up-date the current time information even when power supply to an operation control circuit of the electronic calculator is terminated.

The printer control system includes a detection system for developing a print instruction signal when a preselected condition occurs in the electronic calculator. Upon generation of the print instruction signal, the printer control system activates the printer to print out the current time information stored in the current time information keeping circuit. In a preferred form, the current time information is divided into two groups, one being the date information and the other being the time information regarding hours and minutes. The printer control system is constructed to select a desired one of the above-mentioned groups.

The preselected condition can be one of the following conditions.

1. Actuation of a particular key included in a keyboard panel.
2. Initiation of power supply to a computation circuit included in an electronic calculator.
3. Actuation of a particular key following the initiation of power supply to the computation circuit.
4. When contents stored in a storage means included in an operation control circuit of the electronic calculator reach a preselected value.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
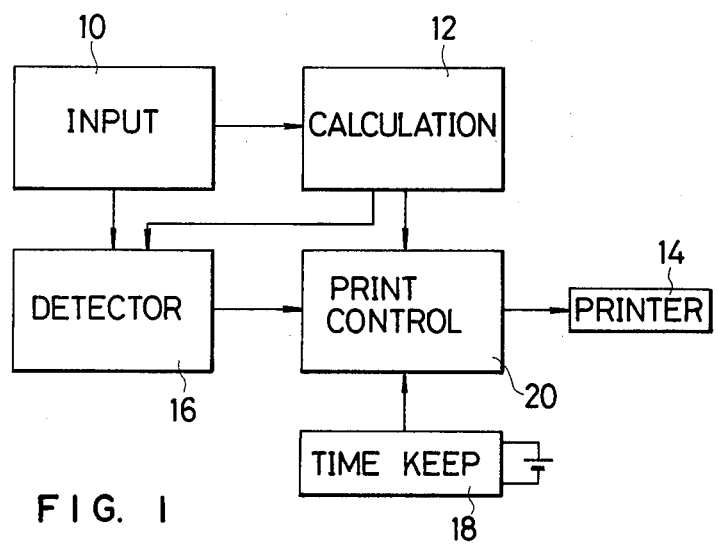
FIG. 1 is a schematic block diagram of an electronic printer calculator of the present invention.

FIG. 1 schematically shows an electronic printer calculator of the present invention.

The electronic printer calculator of the present invention mainly comprises an input control circuit 10, an arithmetic calculation circuit 12, a printer 14, a preselected condition detection circuit 16, a time information keeping circuit 18, and a printer driver control circuit 20.

The input control circuit 10 comprises a keyboard panel including numeral keys and function keys for introducing desired numeral information and operation commands into the electronic printer calculator. The arithmetic calculation circuit 12 performs the arithmetic calculation on the introduced numeral information in accordance with the introduced commands, as is well known in the art. The calculation result stored in the arithmetic calculation circuit 12 is printed out through the printer driver control circuit 20 and the printer 14. The above-mentioned operation is well known in the art and, therefore, the detailed constructions of the input control circuit 10, the printer driver control circuit 20, and the printer 14 have been omitted for the purposes of simplicity.

When a preselected condition occurs in the input control circuit 10, or when a preselected result is stored in a storage means included in the arithmetic calculation circuit 12, the preselected condition detection circuit 16 develops a detection output which is applied to the printer driver control circuit 20. Upon receiving the detection output derived from the preselected condition detection circuit 16, the printer driver control circuit 20 functions to activate the printer 14 to print out the current time information stored in the time information keeping circuit 18.

The above-mentioned preselected condition can be selected from any of a number of conditions. The following are examples of various preselected conditions.

EXAMPLE I

Figure 2:
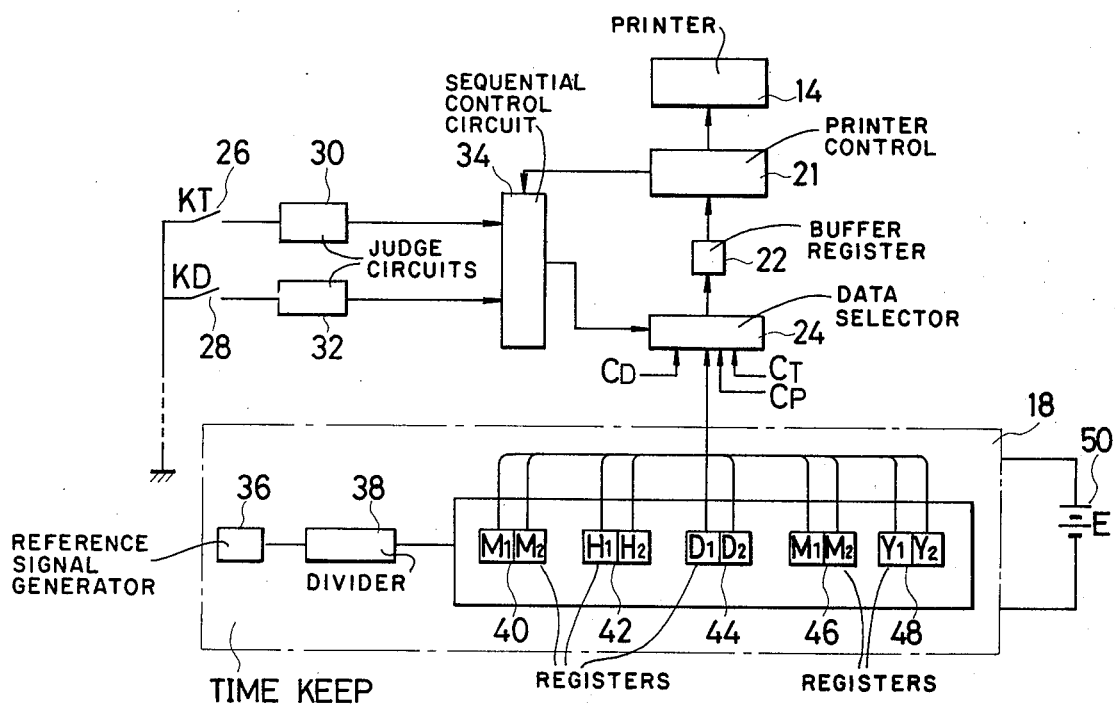
FIG. 2 is a block diagram of an embodiment of an electronic printer calculator of the present invention.

FIG. 2 shows a first example of the electronic printer calculator of the present invention, wherein the detection output is developed when a particular key included in the keyboard panel is actuated.

The system of FIG. 2 mainly comprises the printer 14, a printer control circuit 21, a data selector 24, and the time information keeping circuit 18. The time information keeping circuit 18 comprises a reference frequency signal generator 36, a frequency divider 38, a register 40 ($M_1$, $M_2$) for storing time information related to minutes, a register 42 ($H_1$, $H_2$) for storing time information related to hours, a register 44 ($D_1$, $D_2$) for storing time information related to dates, a register 46 ($M_1$, $M_2$) for storing time information related to months, and a register 48 ($Y_1$, $Y_2$) for storing time information related to years. Each register comprises two sections, for example, $D_1$ and $D_2$ for storing the information of the $10^0$ order and $10^1$ order, respectively. The time information keeping circuit 18 is connected to a power source 50 for continuously receiving power supply to maintain and up date the time information even when the main switch for the calculator operation is switched off.

The printer control circuit 21 controls the printer 14 to print out the information derived from a buffer register 22 in a digit by digit fashion. More specifically, the data selector 24 develops signals in the digit by digit fashion in accordance with contents stored in the registers 40, 42, 44, 46 and 48, and symbol data $C_D$, $C_T$ and $C_P$.

The keyboard panel includes a time information print out instruction key 26, and a date information print out instruction key 28. A judge circuit 30 is associated with the time information print out instruction key 26. Another judge circuit 32 detects the actuation of the date information print out instruction key 28. A sequential control circuit 34 is provided for sequentially controlling the operation of the data selector 24.

When the time information print out instruction key 26 is actuated, the time information stored in the registers 40 and 42 is printed. When the date information print out instruction key 28 is actuated, the date information stored in the registers 44, 46 and 48 is printed out.

Figures 3, 4:
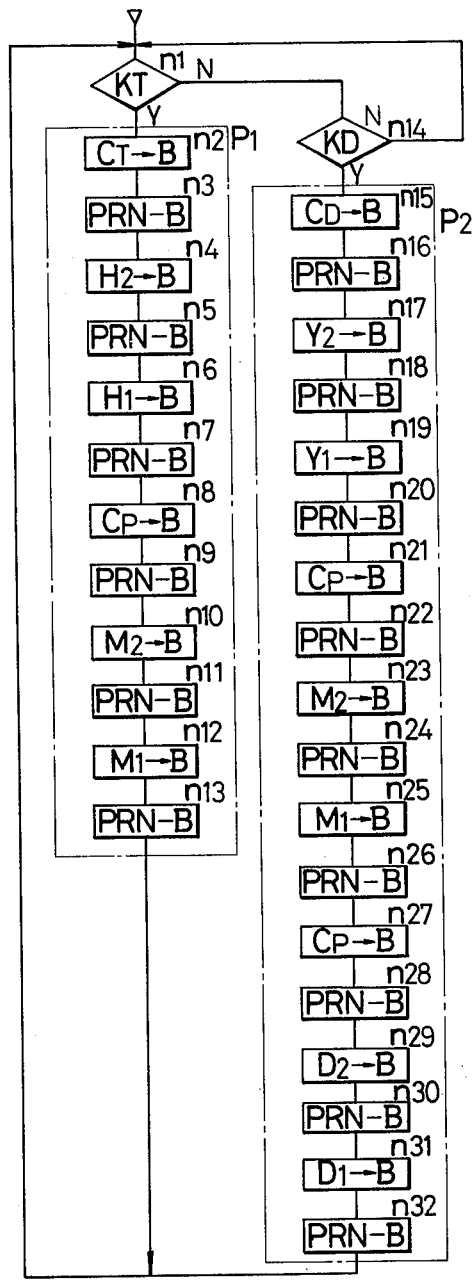
FIG. 3 is a schematic view of actual printouts performed by the electronic printer calculator of FIG. 2.
FIG. 4 is a flow chart for explaining operation of the electronic printer calculator of FIG. 2.

FIG. 3 shows examples of the actual printouts under the condition where the current time information is "Ten Thirty-Five of Dec. 10, 1977." A symbol T is printed out when the symbol date $C_T$ are applied to the printer control circuit 21 through the data selector 24, another symbol D is printed out when the symbol data $C_D$ are applied to the printer control circuit 21 through the data selector 24, and a period "." is printed out when the symbol data $C_P$ are applied to the printer control circuit 21 through the data selector 24.

The operation of the system of FIG. 2 will be described with reference to FIG. 4. The operation sequence is memorized in the sequential control circuit 34, and the sequential operation is initiated by the detection output derived from the judge circuit 30 or 32.

At the first step $n_1$, actuation of the time information print out instruction key 26 is detected by the judge circuit 30. If the time information print out instruction key 26 is not actuated, the program is advanced to the fourteenth step $n_{14}$, where actuation of the date information print out instruction key 28 is detected by the judge circuit 32. If the date information print out instruction key 28 is not actuated, the program is returned to the first step $n_1$.

When the time information print out instruction key 26 is actuated, the program is advanced to a routine $P_1$, which controls the time information print out of the contents stored in the registers 40 and 42. At the step $n_2$, the symbol data $C_T$ are applied to the buffer register 22, and the symbol "T" is printed out at the next step $n_3$ by the printer 14. In a same manner, the steps $n_4$ and $n_5$ control the print out operation of the information stored in the section $H_2(10^1)$ of the register 42. The steps $n_6$ and $n_7$ control the print out operation of the information stored in the section $H_1(10^0)$ of the register 42. The steps $n_8$ and $n_9$ control the print out operation of the period ".". The steps $n_{10}$ and $n_{11}$ control the print out operation of the minute information stored in the section $M_2(10^1)$ of the register 40. And, the steps $n_{12}$ and $n_{13}$ control the print out operation of the minute information stored in the section $M_1(10^0)$ of the register 40.

When the date information print out instruction key 28 is actuated, the program is advanced to a routine $P_2$, which controls the print out operation of the date information stored in the registers 44, 46 and 48.

At the step $n_{15}$, the symbol data $C_D$ are applied from the data selector 24 to the buffer register 22. Then, the symbol "D" is printed out by the printer 14 through the printer control circuit 21 at the following step $n_{16}$. The tens of year information stored in the section $Y_2$ of the register 48 is transferred to the buffer register 22 at the step $n_{17}$, and is printed out at the step $n_{18}$. Similarly, the information stored in the section $Y_1$ of the register 48 is printed out by the steps $n_{19}$ and $n_{20}$. The period "." is printed out by the steps $n_{21}$ and $n_{22}$. The tens of month information stored in the section $M_2$ of the month register 46 is printed out by the steps $n_{23}$ and $n_{24}$. The contents stored in the section $M_1$ of the month register 46 are transferred to the buffer register 22 at the step $n_{25}$, and printed out at the step $n_{26}$. The symbol data $C_P$ are transferred to the buffer register 22 at the step $n_{27}$, and the period "." is printed out at the following step $n_{28}$. The tens of date information stored in the section $D_2$ of the data register 44 is printed out by the steps $n_{29}$ and $n_{30}$. And, the contents stored in the section $D_1$ of the date register 44 are printed out by the step $n_{31}$ and $n_{32}$.

The printer control circuit 21 develops a print completion signal upon every completion of the print out operation of one digit. The thus developed print completion signal is applied to the sequential control circuit 34 to advance the program step.

EXAMPLE II

Figure 5:
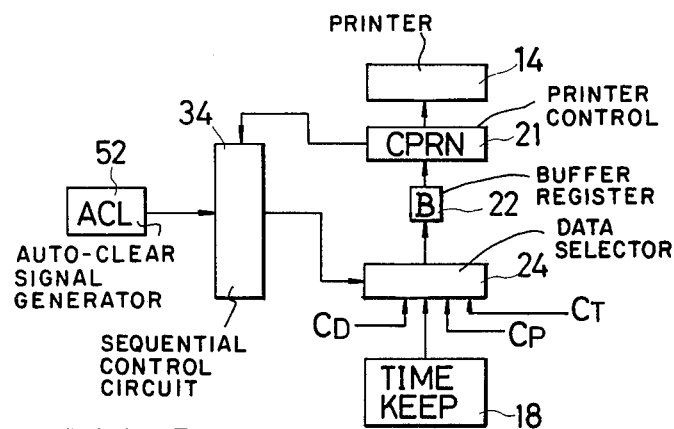
FIG. 5 is a block diagram of another embodiment of a print control system of the present invention.

FIG. 5 shows a print control system of a second example, wherein the detection output is developed when a main power switch of the electronic printer calculator is switched on. Like elements corresponding to those of FIG. 2 are indicated by like numerals.

An auto-clear signal generator 52 is provided for developing an auto-clear signal when the main power switch is switched on. The thus developed auto-clear signal is applied to the sequential control circuit 34 to initiate the print out operation of the routine $P_1$ and/or $P_2$ as already discussed with reference to the example of FIG. 2.

EXAMPLE III

Figure 6:
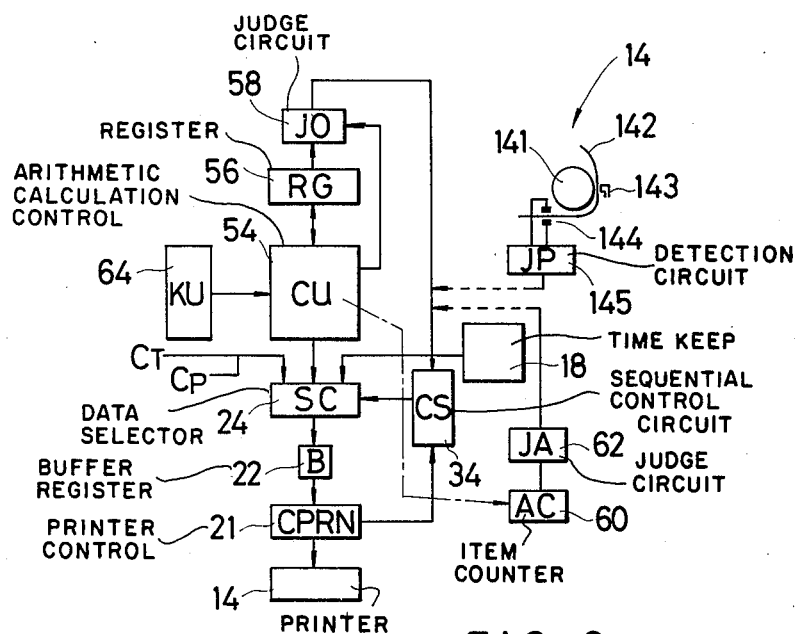
FIG. 6 is a block diagram of still another embodiment of an electronic calculator of the present invention.

FIG. 6 shows a third example of the electronic printer calculator of the present invention, wherein the detection output is developed when a particular storage means included in the electronic printer calculator stores preselected contents. Like elements corresponding to those of FIG. 2 are indicated by like numerals.

The electronic printer calculator of FIG. 6 comprises an arithmetic calculation control circuit 54, a key input unit 64 (keyboard panel), a data register 56 for storing the calculation result derived from the arithmetic calculation control circuit 54, and a judge circuit 58 for detecting whether the contents stored in the data register 56 become a preselected value. The electronic printer calculator of FIG. 6 further comprises an item counter 60, which is included in the arithmetic calculation control circuit 54, and another judge circuit 62 for detecting whether the contents stored in the item counter 60 reach a preselected value.

The printer 14 includes a platen 141, a print receiving paper 142, and hammers 143. A sensor 144 is provided for detecting a trailing edge of the print receiving paper 142. An output signal of the sensor 144 is applied to a detection circuit 145. Remaining portions are similar to those disclosed in FIG. 2 and, therefore, detailed description thereof is omitted for the purposes of simplicity.

By properly presetting a desired value in the judge circuit 58, the sequential control circuit 34 can initiate its operation when the data register 56 stores the desired value. Or, by properly presetting a preferred value in the judge circuit 62, the sequential control circuit 34 initiates its operation when the item counter 60 reaches the preferred value. Moreover, the print out operation can be conducted in response to the detection output derived from the detection circuit 145. That is, the time information can be printed out at the end of the roll of the print receiving paper 142. The print out operation can be the same as that discussed with reference to FIG. 4.

EXAMPLE IV

Figure 7:
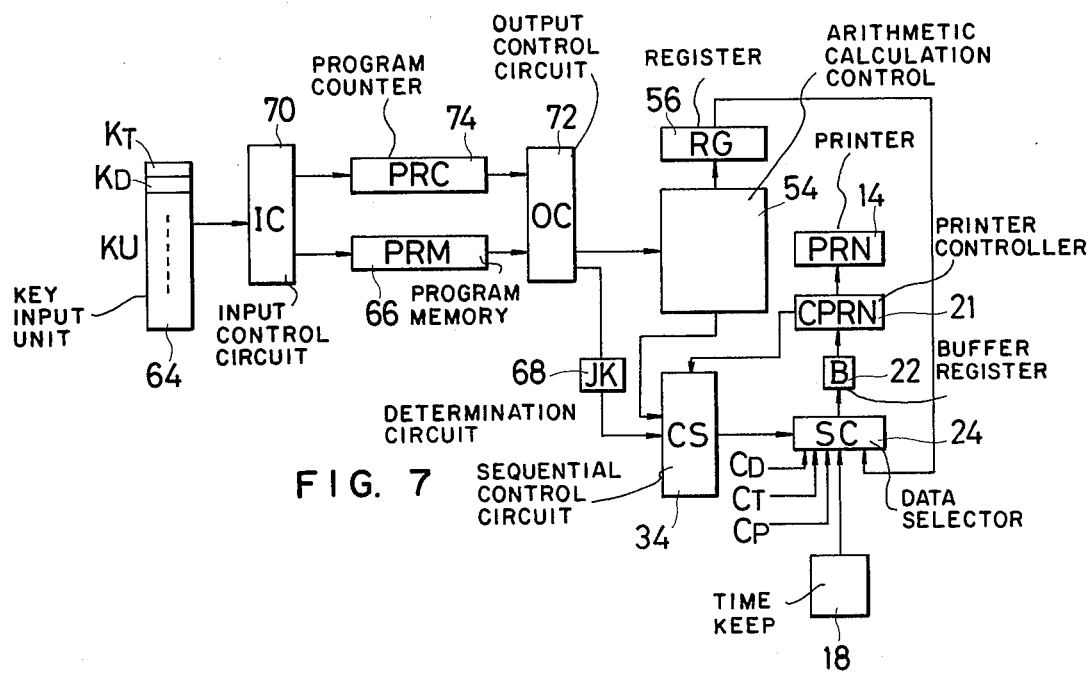
FIG. 7 is a block diagram of yet another embodiment of an electronic calculator of the present invention.

FIG. 7 shows a fourth example of the present invention. This example relates to a key input type programmable calculator. Like elements corresponding to those of FIG. 6 are indicated by like numerals.

The programmable calculator of FIG. 7 comprises a program memory 66, and a determination circuit 68 for detecting whether the program memory 66 develops a signal corresponding to actuation of the time information print out instruction key 26 or the date information print out instruction key 28. The detection output of the determination circuit 68 is applied to the sequential control circuit 34 to initiate the print out operation.

In the programmable calculator of FIG. 7, a desired program can be introduced into the program memory 66 through the key input unit 64 and an input control circuit 70. The program stored in the program memory 66 is read out through an output control circuit 72, which is controlled by a program counter 74, and applied to the arithmetic calculation control circuit 54. Therefore, the operator can program a desired sequence, wherein the time information is printed out at a desired time.

EXAMPLE V

Figure 8:
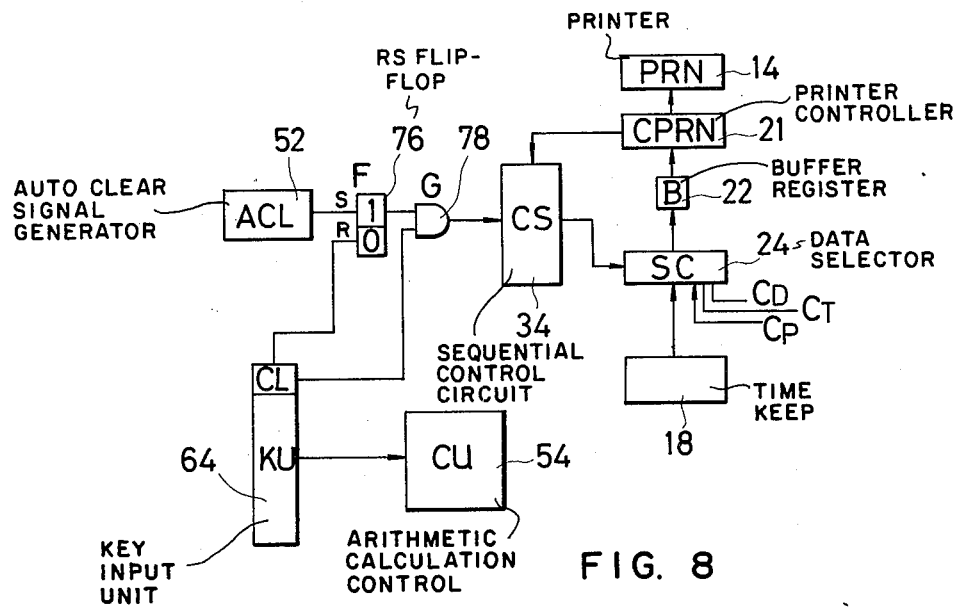
FIG. 8 is a block diagram of a further embodiment of an electronic calculator of the present invention.

FIG. 8 shows a fifth example of the electronic printer calculator of the present invention, wherein the detection output is developed when a particular key included in the keyboard panel is first actuated after the main power switch is switched on. Like elements corresponding to those of FIGS. 5 and 6 are indicated by like numerals.

This example is a combination of the first and second examples. The electronic printer calculator of FIG. 8 comprises an R-S type flip-flop 76, and an AND gate 78. The set input terminal of the R-S flip-flop 76 is connected to receive the auto-clear signal derived from the auto-clear circuit 52 which is responsive to the switching operation of the main power switch. The reset input terminal of the R-S flip-flop 76 is connected to the keyboard panel 64. And the AND gate 78 receives an output signal of a particular key, for example, the clear key, and the set output signal of the R-S flip-flop 76. An output signal of the AND gate 78 is applied to the sequential control circuit 34 to initiate the print out operation of the time information stored in the time information keeping circuit 18.

Accordingly, the R-S flip-flop 76 is set when the main power switch is switched on. Under these conditions when the clear key is actuated, the AND gate 78 develops the output signal to activate the sequential control circuit 34. When any key other than the clear key is actuated under the condition where the R-S flip-flop 76 is set, the R-S flip-flop 76 is reset and, therefore, the output signal will not be developed from the AND gate 78. Once the AND gate 78 develops the output signal, the R-S flip-flop 76 is reset and, therefore, the print out operation will not be conducted any more.

The invention being thus described, it will be obvious that the same may be varied in many ways. Such variations are not to be regarded as a departure from the spirit and the scope of the invention, and all such modifications are intended to be included within the scope of the following claims.

What is claimed is:

1. An electronic calculator system having a printer for printing desired data produced by said calculator system, said system comprising:
    a time generator for producing data representative of current time information;
    counter means for producing an incremental count and for generating an output signal when said count reaches a predetermined level; and
    printing selection means responsive to the output signal generated by said counter means for converting said current time information produced by said time generator into desired data and presenting this data to said printer;
    said printer printing said time information when count within said counter means reaches a predetermined level.

2. The system of claim 1 wherein said data representative of current time information includes date information.

3. The system of claim 1 wherein said printer includes a print receiving paper strip; and
    wherein said print selector means is further responsive to the presence of the trailing edge of said paper strip.

4. An electronic calculator system having a printer for printing desired data produced by said calculator system, said system comprising:
    a time generator for producing data representative of current time information;
    program memory means for storing a program representative of times where a printout of said current time information is desired;

coincidence determination means for producing an output signal when one of the times stored in said program memory means coincides with said data representative of current time information; and printing selector means responsive to the output signal generated by said coincidence determination means for converting said data representative of current time information into desired data and presenting this desired data to said printer.

5. The system of any of claims 1 or 4 wherein said data representative of current time information includes time of day information.

* * * * *